(12) United States Patent
Kobayashi et al.

(10) Patent No.: US 11,556,976 B2
(45) Date of Patent: Jan. 17, 2023

(54) SERVER APPARATUS, MOBILE SHOP, AND INFORMATION PROCESSING SYSTEM

(71) Applicant: TOYOTA JIDOSHA KABUSHIKI KAISHA, Toyota (JP)

(72) Inventors: Ryosuke Kobayashi, Nagakute (JP); Ayana Takeshita, Kasugai (JP); Naoki Yamamuro, Nagoya (JP); Takuya Maekawa, Nagoya (JP); Yugo Sakurai, Setagaya-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 35 days.

(21) Appl. No.: 17/012,464

(22) Filed: Sep. 4, 2020

(65) Prior Publication Data

US 2021/0065284 A1 Mar. 4, 2021

(30) Foreign Application Priority Data

Sep. 4, 2019 (JP) .............................. JP2019-161561

(51) Int. Cl.
*G06Q 30/00* (2012.01)
*G06Q 30/06* (2012.01)
*G06Q 30/02* (2012.01)
*G06V 20/00* (2022.01)

(52) U.S. Cl.
CPC ..... *G06Q 30/0639* (2013.01); *G06Q 30/0206* (2013.01); *G06Q 30/0631* (2013.01); *G06V 20/00* (2022.01); *G06F 2221/2129* (2013.01)

(58) Field of Classification Search
None
See application file for complete search history.

(56) References Cited

U.S. PATENT DOCUMENTS

| 8,751,318 B2 * | 6/2014 | Kim ...................... G06Q 30/02 725/22 |
| 10,043,360 B1 * | 8/2018 | Mullins .............. G08B 13/1968 |
| 10,186,124 B1 * | 1/2019 | Mullins ............ G08B 13/19682 |
| 10,266,196 B1 * | 4/2019 | Sinha ........................ B62B 5/06 |
| 10,552,792 B2 * | 2/2020 | Mattingly .......... G06K 19/0723 |
| 11,023,957 B1 * | 6/2021 | Montague ............. H04W 4/023 |

(Continued)

FOREIGN PATENT DOCUMENTS

| JP | 2007-011510 A | | 1/2007 |
| KR | 20170085031 A | * | 7/2017 |
| WO | WO 2019/038968 A1 | | 2/2019 |

OTHER PUBLICATIONS

Jnagal, Amit "Image Recognition for Product and Shelf Monitoring and Analysis" Dec. 12, 2018. Retrieved from https://www.infrrd.ai/blog/image-recognition-for-product-and-shelf-monitoring-and-analysis (Year: 2018).*

(Continued)

*Primary Examiner* — Naeem U Haq
(74) *Attorney, Agent, or Firm* — Oblon, McClelland, Maier & Neustadt, L.L.P.

(57) ABSTRACT

A server apparatus includes a controller configured to detect an item to be purchased, based on a temporal change in captured images of an item display position at a mobile shop and, upon acquiring authentication information for a purchaser from a first terminal apparatus, perform a charging process in respect of the purchaser for a price of the item.

10 Claims, 10 Drawing Sheets

(56) References Cited

U.S. PATENT DOCUMENTS

| | | | |
|---|---|---|---|
| 2006/0061654 A1* | 3/2006 | McKay | G08B 13/1968 |
| | | | 340/539.1 |
| 2015/0294398 A1* | 10/2015 | Khalid | G06Q 30/0639 |
| | | | 705/26.7 |
| 2016/0180441 A1* | 6/2016 | Hasan | G06F 3/0482 |
| | | | 705/26.7 |
| 2019/0152376 A1* | 5/2019 | Schwartz | G06Q 10/04 |
| 2019/0197859 A1* | 6/2019 | Kanehara | G06V 20/10 |
| 2019/0215424 A1* | 7/2019 | Adato | G06V 40/10 |
| 2020/0202416 A1* | 6/2020 | Ark | G06K 19/07773 |
| 2020/0279382 A1* | 9/2020 | Zhang | G06V 40/28 |
| 2020/0327315 A1* | 10/2020 | Mullins | H04N 7/181 |
| 2020/0401970 A1* | 12/2020 | Xu | G06Q 10/06316 |
| 2021/0396065 A1* | 12/2021 | Hara | B61L 23/041 |
| 2022/0157063 A1* | 5/2022 | Bronicki | H04N 5/23229 |

OTHER PUBLICATIONS

Suzuki, J., et al., "Amazing mechanism of the amazing convenience store revolution 'Amazon Go', the truth of magical AI technology", Business Insider, Feb. 15, 2018, pp. 1-29 (with unedited computer generated English translation), 58 total pages.

* cited by examiner

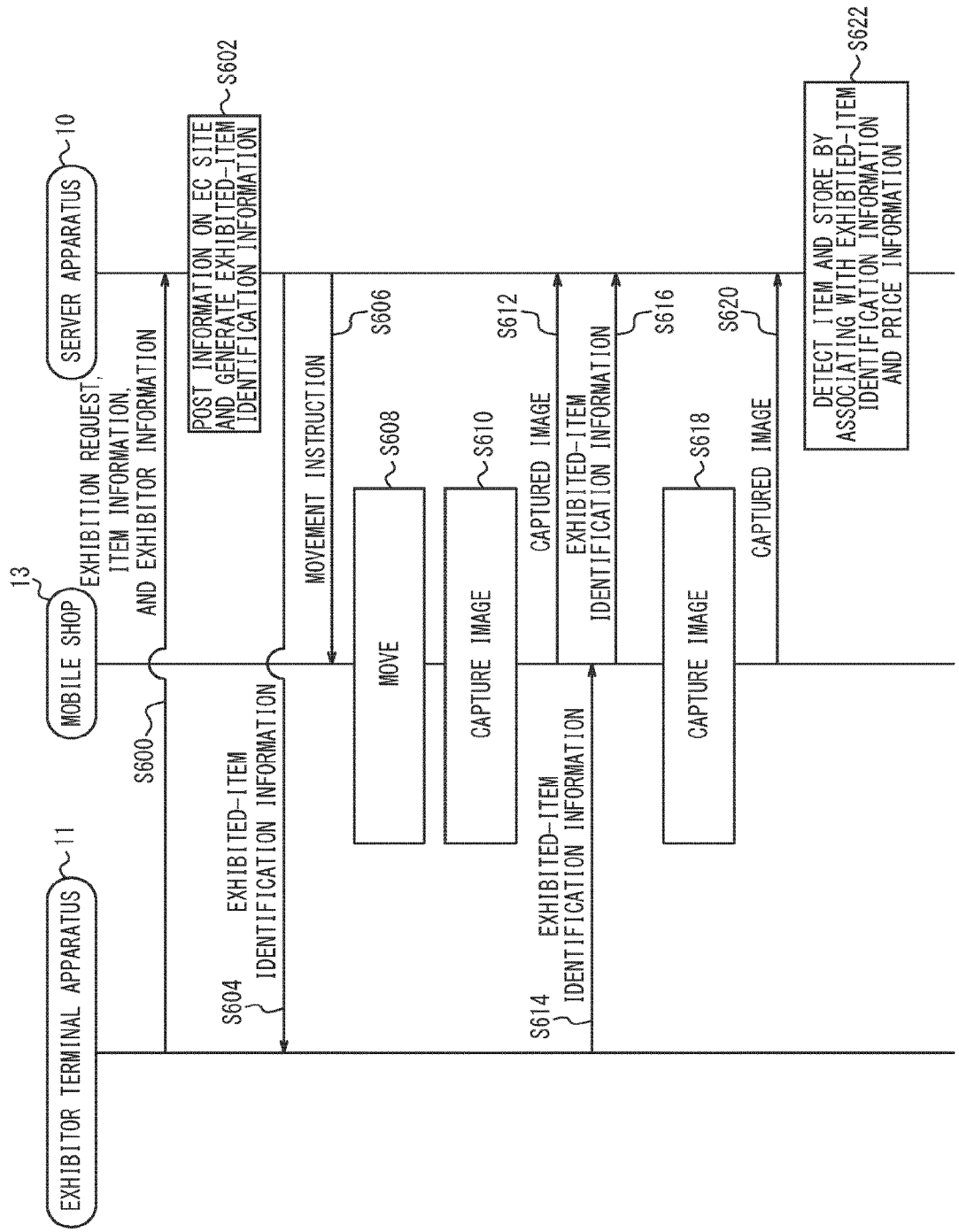

SERVER APPARATUS, MOBILE SHOP, AND INFORMATION PROCESSING SYSTEM

CROSS-REFERENCE TO RELATED APPLICATIONS

The present application claims priority to Japanese patent application No. 2019-161561, filed on Sep. 4, 2019, the entire disclosure of which is incorporated herein by reference.

TECHNICAL FIELD

The present disclosure relates to a server apparatus, a mobile shop, and an information processing system.

BACKGROUND

Techniques that support arbitrary and relatively free trading of items between concerned parties such as exhibitors and purchasers, for example, in a flea market or the like are known. JP 2007-011510 A (PTL 1) discloses an example of a system that supports an unmanned flea market in which exhibitors do not meet purchasers.

CITATION LIST

Patent Literature

PTL 1: JP2007011510A

SUMMARY

However, there is room for improving convenience by reducing the workload and administrative load on exhibitors and purchasers in steps including item exhibition, item display, item browsing, item purchase, and charging resulting therefrom.

An object of the present disclosure is to provide a server apparatus and the like that improves convenience by reducing workload and administrative load in relation to the trading of items between concerned parties.

A server apparatus according to the present disclosure includes a controller configured to detect an item to be purchased, based on a temporal change in captured images of an item display position in a mobile shop and, upon acquiring authentication information for a purchaser from a first terminal apparatus, perform a charging process in respect of the purchaser for a price of the item.

A mobile shop according to the present disclosure includes an imager; a communication interface; and a controller configured to control the imager and transmit and receive information with another apparatus via the communication interface, wherein when moving to a collection point of an item to be exhibited in response to an instruction from a server apparatus, the controller causes the imager to acquire a first captured image by imaging an item display position at which items are displayed, and then transmits the first captured image to the server apparatus.

According to the present disclosure, there is provided an information processing system comprising a first terminal apparatus, a mobile shop, and a server apparatus, wherein: the first terminal apparatus is configured to transmit a position of a collection point for an item to be exhibited to the server apparatus, and acquire identification information that identifies the item for sale from the server apparatus; the server apparatus is configured to transmit an instruction to the mobile shop, instructing the mobile shop to move to the collection point and collect the item; the mobile shop is configured to move to the collection point in response to the instruction, acquires a captured image by imaging an item display position in which items are displayed, and transmit the captured image to the server apparatus; the first terminal apparatus is configured to transmit the identification information to the server apparatus; and if the captured image acquired when the identification information is acquired from the first terminal apparatus, contains an item not contained in past captured images the server apparatus detects the item added to the display position as an item for sale.

The server apparatus and the like according to the present disclosure can improve convenience by reducing the workload and administrative load in relation to the trading of items between concerned parties.

BRIEF DESCRIPTION OF THE DRAWINGS

In the accompanying drawings:

FIG. 6 is a sequence chart illustrating an exemplary operation of the information processing system when an item is exhibited;

DETAILED DESCRIPTION

Hereinafter, an embodiment will be described.

Figure 1:
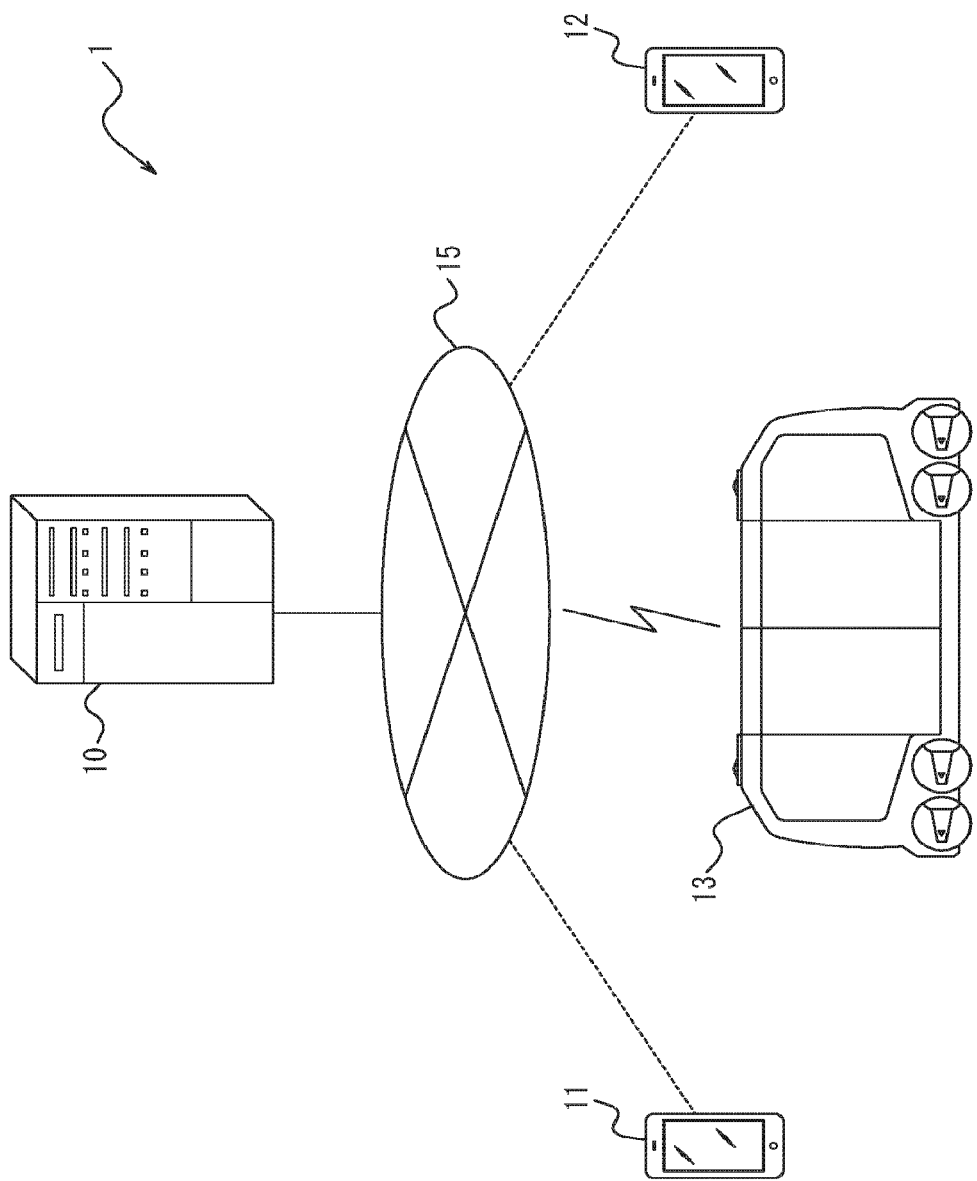
FIG. 1 illustrates an exemplary configuration of an information processing system.

FIG. 1 illustrates an exemplary configuration of an information processing system according to an embodiment. The information processing system 1 provides a virtual flea-market function to exhibitors and purchasers of various types of items. The information processing system 1 includes one or more server apparatuses 10, one or more exhibitor terminal apparatuses 11, one or more purchaser terminal apparatuses 12, and one or more mobile shops 13, which are connected with one another, for example, via a network 15 in such a way as to enable communication of information. The server apparatus 10 functions, for example, as an EC server for a flea-market broker operating an electronic commerce (EC) site and instructs operations, such as movement and the like, of the mobile shops 13. The exhibitor terminal apparatus 11 and the purchaser terminal apparatus 12, which are information processing terminal apparatuses used by an exhibitor and a purchaser, respectively, are implemented, for example, by personal computers, tablet terminal apparatuses, smartphones or the like. The mobile shop 13 is, for example, a multi-purpose vehicle capable of manual driving or manned/unmanned self-driving and is equipped with shop facilities for sales of items. The network 15 is, for example, the Internet, but may be an ad-hoc network, a LAN, a Metropolitan Area Network (MAN), another network, or any combination thereof.

In the information processing system 1, items are traded as outlined below. In response to a request from the exhibitor terminal apparatus 11 of an exhibitor who wishes to exhibit an item, the server apparatus 10 causes the mobile shop 13 to move to a collection point for collection of the item. The server apparatus 10 provides item information to purchasers by posting the information on an EC site, and when a purchase request is acquired from the purchaser terminal apparatus 12 of a purchaser who wishes to purchase the item, the server apparatus 10 causes the mobile shop 13 to move to a purchase point specified by the purchaser. The purchaser enters the mobile shop 13 that has arrived, is authenticated, and then removes the desired item from an item display position. The mobile shop 13 images the item display position over time and sends captured images to the server apparatus 10. Then, based on temporal changes in the captured images, the server apparatus 10 detects when the item is exhibited at the display position and when the item is removed by the purchaser. When the item is removed, the server apparatus 10 performs a charging process with respect to the purchaser.

According to the operations described above wherein the mobile shop 13 is interposed, the information processing system 1 can reduce the labor involved in exhibition by the exhibitor as well as purchasing and payment by the purchaser, making it possible to improve convenience for the exhibitor and the purchaser. Also, by using captured images to keep track of items displayed in the mobile shop 13, the information processing system 1 enables reduction or omission of personnel assigned to the mobile shop 13. Thus, the information processing system 1 can reduce the load on the flea-market broker as well.

Figure 2:
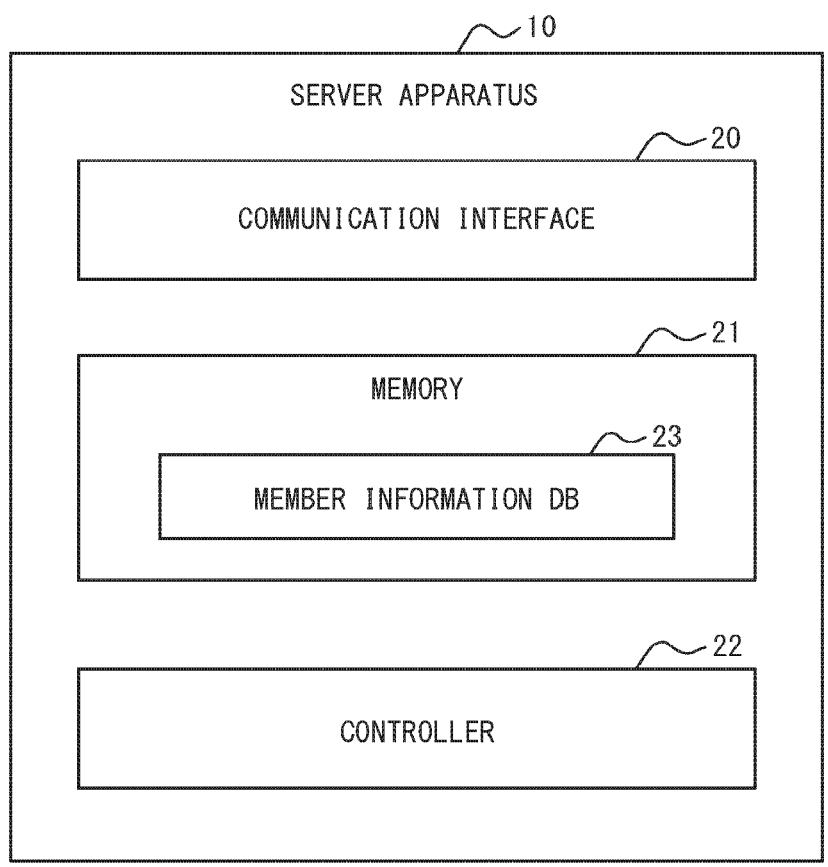
FIG. 2 illustrates an exemplary configuration of a server apparatus.

FIG. 2 illustrates an exemplary configuration of the server apparatus 10. The server apparatus 10 includes a communication interface 20, a memory 21, and a controller 22. The server apparatus 10 may perform the operations of the present embodiment by communication and cooperation with another server apparatus having an equivalent configuration.

The communication interface 20 includes one or more communication modules conforming to wired or wireless LAN standards for connecting to the network 15. In the present embodiment, the server apparatus 10 is connected to the network 15 via the communication interface 20.

The memory 21 includes, for example, a semiconductor memory, a magnetic memory, an optical memory, or the like. The memory 21 functions as a main memory, an auxiliary memory, or a cache memory. The memory 21 stores, for example, control/processing programs, a member information database 23, any information that are used for operation of the server apparatus 10.

The controller 22 includes, for example, one or more general-purpose processors such as central processing units (CPUs) or one or more dedicated processors specializing in a specific process. Alternatively, the controller 22 may include a dedicated circuit such as a field-programmable gate array (FPGA) or an application specific integrated circuit (ASIC). The controller 22 collectively controls operation of the server apparatus 10 by operating in accordance with control/processing programs or by operating in accordance with operation procedures implemented as circuits. The controller 22 performs operation according to the present embodiment by transmitting and receiving various types of information with the exhibitor terminal apparatus 11 and the purchaser terminal apparatus 12 and by transmitting and receiving various types of information including captured images with the mobile shop 13 via the communication interface 20.

Figure 3:
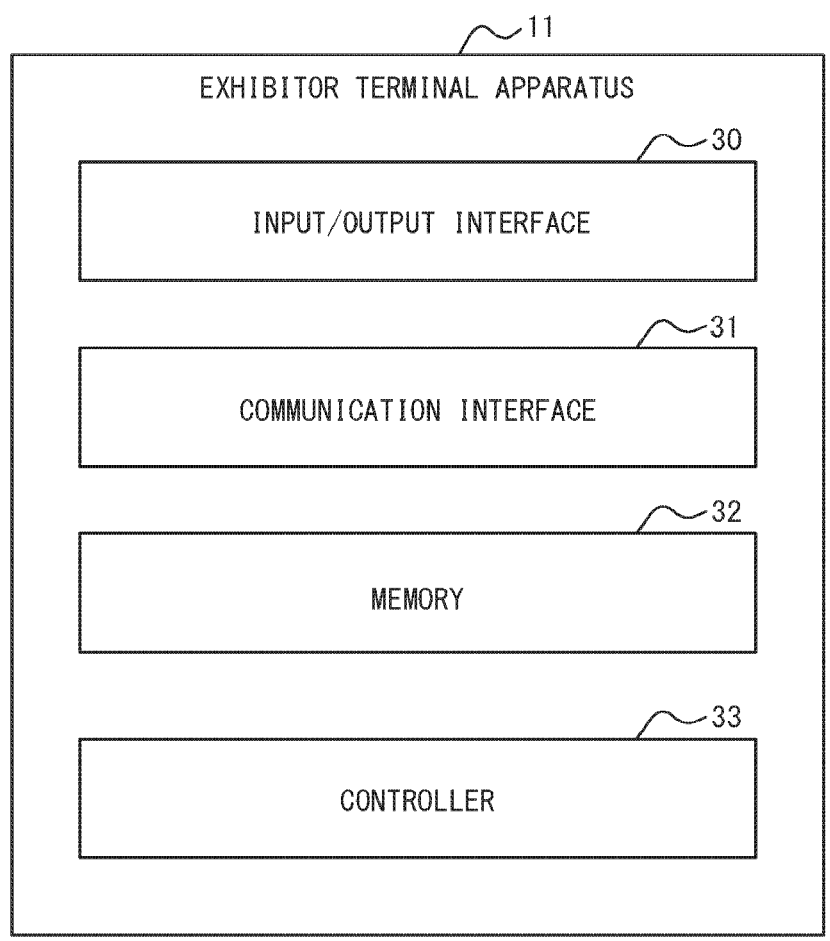
FIG. 3 illustrates an exemplary configuration of a terminal apparatus for exhibition.

FIG. 3 illustrates an exemplary configuration of the exhibitor terminal apparatus 11. The exhibitor terminal apparatus 11 is, for example, an information processing terminal apparatus such as a personal computer, a tablet terminal apparatus, or a smartphone. The exhibitor terminal apparatus 11 includes an input/output interface 30, a communication interface 31, a memory 32, and a controller 33.

The input/output interface 30 includes an input interface configured to detect an input from the user and transmit input information to the controller 33. The input interface is any appropriate input interface including, for example: physical keys; capacitive keys; a touchscreen integrated with a panel display; various types of pointing devices; a microphone configured to accept voice input; and a camera configured to capture images or image codes. The input/output interface 30 also includes an output interface configured to output information to the user, including information generated by the controller 33 and information acquired from the server apparatus 10. The output interface is any appropriate output interface including, for example, an external or built-in display configured to output information as images or videos, a speaker configured to output information as sound, or an interface for connecting to an external output device.

The communication interface 31 includes a communication module conforming to wired or wireless LAN standards, a module conforming to the 4th generation (4G), 5th generation (5G), or other mobile communication standards, and a communication module compatible with short-range communication such as Bluetooth® (Bluetooth is a registered trademark in Japan, other countries, or both), AirDrop® (AirDrop is a registered trademark in Japan, other countries, or both), IrDA, ZigBee® (ZigBee is a registered trademark in Japan, other countries, or both), Felica® (Felica is a registered trademark in Japan, other countries, or both), or RFID. Using the communication interface 31, the exhibitor terminal apparatus 11 connects to the network 15 via a router apparatus in the vicinity thereof or a mobile-communications base station and communicates information with the server apparatus 10 via the network 15. Also, using the communication interface 31, the exhibitor terminal apparatus 11 communicates information with other apparatuses located within a range in which communication can be performed by using a short-range communication means.

The memory 32 includes, for example, a semiconductor memory, a magnetic memory, an optical memory, or the like. The memory 32 functions as a main memory, an auxiliary memory, or a cache memory, for example. The memory 32 stores any information used for operation of the exhibitor terminal apparatus 11. For example, the memory 32 stores: control/processing programs, application programs downloaded via the network 15 and configured to provide various functions, and the like.

The controller 33 includes, for example, one or more general-purpose processors such as CPUs or micro processing units (MPUs), or one or more dedicated processors specializing in a specific process. Alternatively, the controller 33 may include one or more dedicated circuits such as FPGAs or ASICs. The controller 33 collectively controls operation of the exhibitor terminal apparatus 11 by operating in accordance with the control/processing programs or by operating in accordance with operation procedures implemented as circuits. The controller 33 performs operations according to the present embodiment by transmitting and receiving various types of information with the server apparatus 10 via the communication interface 31.

Figure 4:
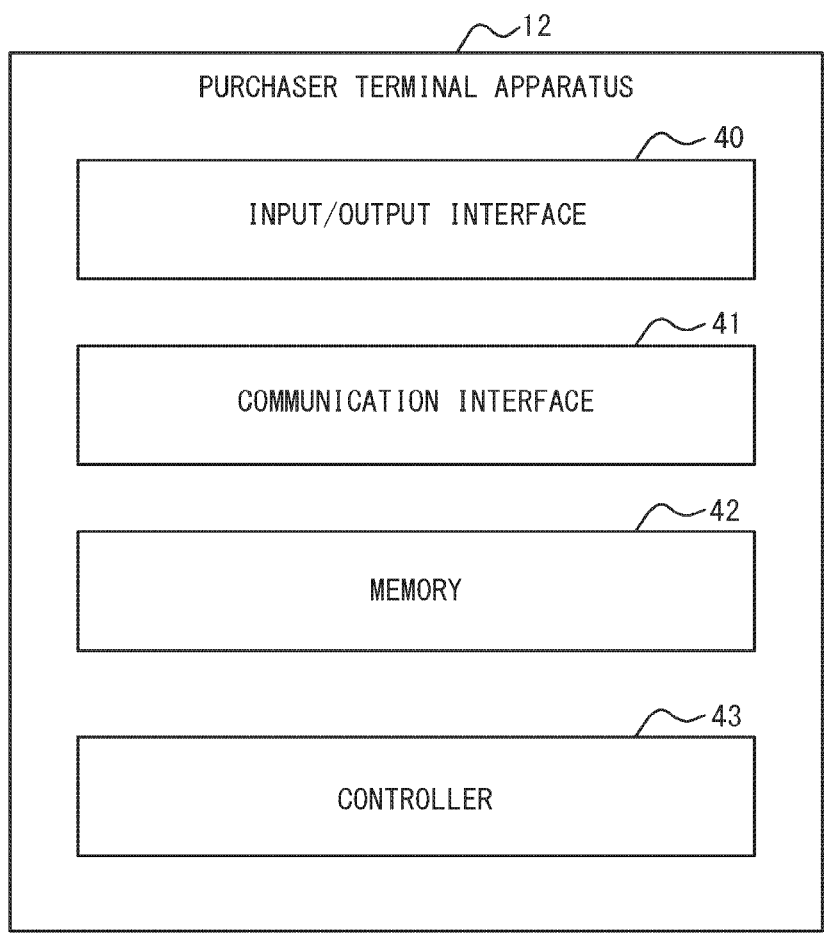
FIG. 4 illustrates an exemplary configuration of a terminal apparatus for purchasing.

FIG. 4 illustrates an exemplary configuration of the purchaser terminal apparatus 12. The purchaser terminal apparatus 12 is, for example, an information processing terminal apparatus such as a personal computer, tablet terminal apparatus, or smartphone. The purchaser terminal apparatus 12 includes an input/output interface 40, a communication interface 41, a memory 42, and a controller 43. The input/output interface 40, communication interface 41, the memory 42, and the controller 43 have configurations equivalent, respectively, to the configurations of the input/output interface 30, the communication interface 31, the memory 32, and the controller 33 of the exhibitor terminal apparatus 11 described with reference to FIG. 3. In the purchaser terminal apparatus 12, the controller 43 collectively controls operation of the purchaser terminal apparatus 12 by operating in accordance with the control/processing programs or by operating in accordance with operation procedures implemented as circuits. The controller 43 performs operations according to the present embodiment by transmitting and receiving various types of information with the server apparatus 10 via the communication interface 41.

Figure 5:
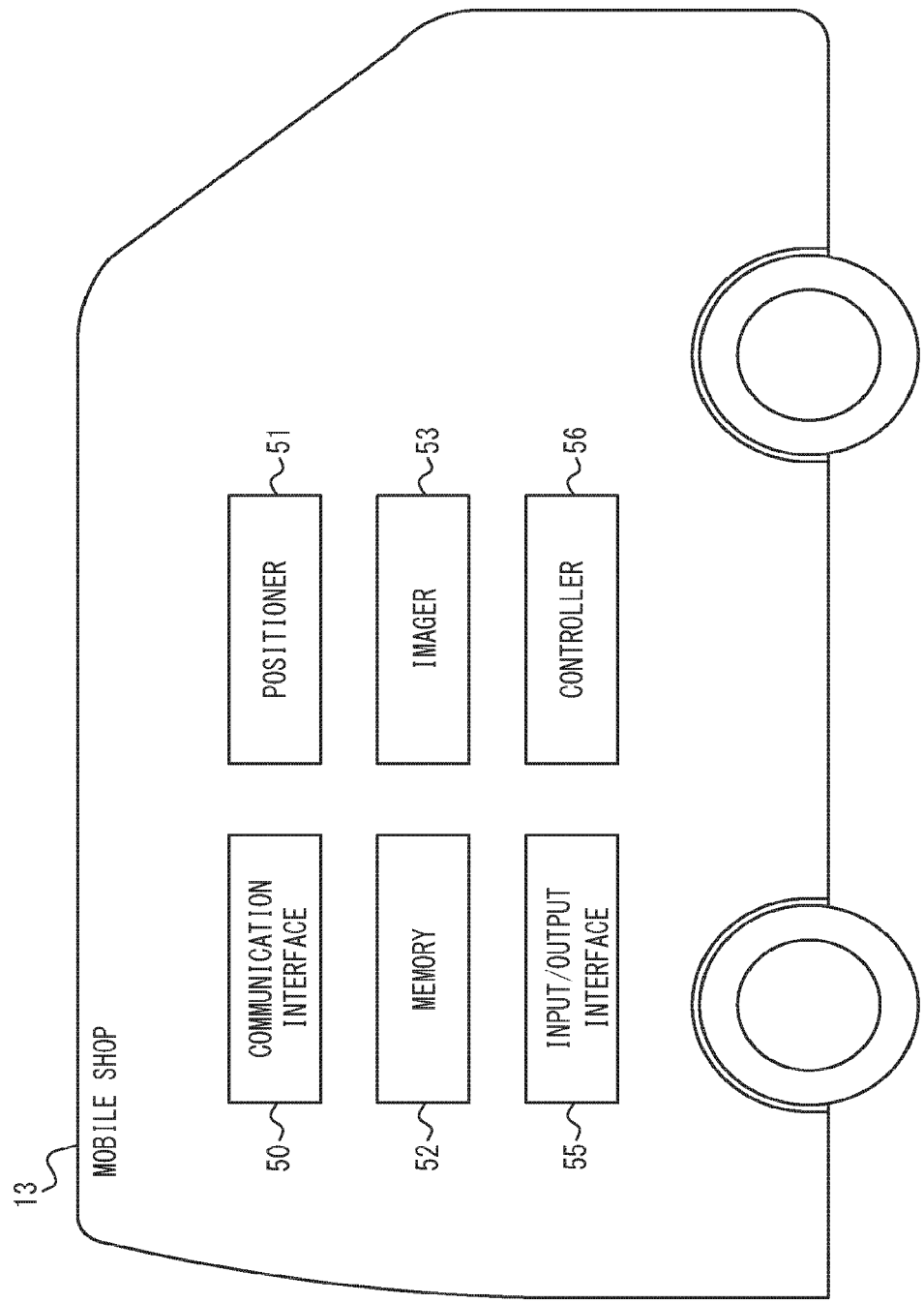
FIG. 5 illustrates an exemplary configuration of a mobile shop.

FIG. 5 illustrates an exemplary configuration of the mobile shop 13. The mobile shop 13 is a multi-purpose vehicle capable of manual driving or manned/unmanned self-driving and is configured such that facilities can be mounted in an interior space, wherein the facilities differ according to intended uses, such as sales, lodging, and passenger transportation. According to the present embodiment, the mobile shop 13 is provided with shop facilities for sales of items. The shop facilities include item display positions which are used to display items. Examples of the display positions include a display rack, a showcase, or a wall surface that has hooks capable of hanging items. At the item display positions, each item is displayed in such a way as to be visible at least partially without being hidden by another item. The mobile shop 13 includes a communication interface 50, a positioner 51, a memory 52, an imager 53, an input/output interface 55, and a controller 56. These components are connected so as to be able to communicate with each other in a wired or wireless manner via an on-vehicle network such as a controller area network (CAN) or a dedicated network. Some or all of the communication interface 50, the positioner 51, the memory 52, the imager 53, the input/output interface 55, and the controller 56 may be provided directly in the mobile shop 13, or provided in an information processing apparatus such as a car navigation apparatus detachably attached to the mobile shop 13. The mobile shop 13 may be driven by a driver or driven automatically at any level. The level of automatic driving is, for example, any of levels 1 to 5 defined by the Society of Automotive Engineers (SAE).

The communication interface 50 includes a communication module conforming to wired or wireless LAN standards, a module conforming to the 4G, 5G, or other mobile communication standards, and a communication module compatible with short-range communication such as Bluetooth, AirDrop, IrDA, ZigBee, Felica, or RFID. Using the communication interface 50, the mobile shop 13 connects to the network 15 via a mobile-communications base station and communicates information with the server apparatus 10 via the network 15. Also, using the communication interface 50, the mobile shop 13 communicates information with another apparatus such as the purchaser terminal apparatus 12 located within a range in which communication can be conducted by short-range communication means.

The positioner 51 measures the position of the mobile shop 13 and generates position information. The position information includes coordinates such as two-dimensional coordinates or three-dimensional coordinates for pinpointing a position on a map. The position information is not limited to coordinates, and may include speed, a moving route, a moving distance, the amount of change or rate of change thereof, or the like. The positioner 51 includes a receiver supporting a satellite navigation system. The satellite navigation system supported by the receiver may be, for example, the Global Positioning System (GPS). Alternatively, the positioner 51 may include an acceleration sensor, a gyro sensor, or the like. For example, a car navigation apparatus may function as the positioner 51.

The memory 52 includes, for example, a semiconductor memory, a magnetic memory, an optical memory, or the like. The memory 52 functions as a main memory, an auxiliary memory, or a cache memory, for example. The memory 52 stores any information used for operation control of the mobile shop 13. For example, the memory 52 stores: control/processing programs, application programs downloaded via the network 15 and configured to provide various functions, and the like.

The imager 53, which is provided at a position where item display positions in the mobile shop 13 can be imaged, includes one or more cameras and control circuits thereof. The camera of the imager 53 may be a monocular camera or stereo camera.

The input/output interface 55 includes an input interface configured to detect an input from the user and transmit input information to the controller 56. The input interface is an arbitrary input interface including, for example: physical keys, capacitive keys, a touchscreen integrated with a panel display, various pointing devices, a microphone configured to accept voice input, a camera configured to capture images or image codes, and an IC card reader.

The input/output interface 55 also includes an output interface configured to output information to the user, including information generated by the controller 56 and information acquired from the server apparatus 10. The output interface is any appropriate output interface including, for example, an external or built-in display configured to output information as images or videos, a speaker configured to output information as sound, or an interface for connecting to an external output device.

The controller 56 includes one or more general-purpose processors such as CPUs or MPUs or one or more dedicated processors specializing in a specific process. Alternatively, the controller 56 may include one or more dedicated circuits such as FPGAs or ASICs. The controller 56 collectively controls operation of the mobile shop 13 including the communication interface 50, positioner 51, memory 52, imager 53, and input/output interface 55 by operating in accordance with stored control/processing programs or by operating in accordance with operation procedures implemented as circuits. The controller 56 performs operation according to the present embodiment by transmitting and receiving various types of information including images captured by the imager 53 with the server apparatus 10 and transmitting and receiving various types of information with the exhibitor terminal apparatus 11 and the purchaser terminal apparatus 12, via the communication interface 50.

FIG. 6 is a sequence chart illustrating exemplary operations of the information processing system 1 when an item is exhibited. The procedures of FIG. 6 are carried out when the exhibitor exhibits an item by operating the exhibitor terminal apparatus 11. FIG. 6 illustrates steps in which each of the server apparatus 10, the exhibitor terminal apparatus 11, the purchaser terminal apparatus 12, and the mobile shop 13 perform information processing and control by transmitting and receiving information with the other apparatuses. The steps correspond to operations performed by the controllers of the respective apparatuses.

The exhibitor terminal apparatus 11 transmits an exhibition request, item information, and exhibitor information to the server apparatus 10 by being operated by the exhibitor, and the server apparatus 10 acquires the item information and the exhibitor information (step S600). The exhibitor enters the item information and the exhibitor information, for example, manually via a touchscreen. The item information includes, for example, the type, name, attributes, price, and captured images of an item. The exhibitor information includes identification information such as the name of the exhibitor as well as position information about the item collection point specified by the exhibitor. The information described above may be transmitted to the server apparatus 10 in advance by the exhibitor in a one-time member registration process for an EC site on the server apparatus 10, and stored in a member information DB 23 of the server apparatus 10, or may be transmitted from the exhibitor terminal apparatus 11 to the server apparatus 10 each time an item is exhibited.

Next, the server apparatus 10 provides item information to purchasers by posting the information on the EC site, and generates exhibited-item identification information configured to identify the exhibited item uniquely by associating the item with the exhibitor (step S602).

Next, the server apparatus 10 transmits the exhibited-item identification information to the exhibitor terminal apparatus 11, which consequently acquires the exhibited-item identification information (step S604).

Next, the server apparatus 10 transmits an instruction to the mobile shop 13, instructing the mobile shop 13 to move to the item collection point, and the controller 56 of the mobile shop 13 acquires the movement instruction (step S606). Then, under the control of the controller 56, the mobile shop 13 moves to the item collection point (step S608).

In the mobile shop 13, the imager 53 images the item display position (step S610) and transmits a captured image to the server apparatus 10, which then acquires the captured image (step S612). The imager 53 of the mobile shop 13 images the item display position at least once from the time when the mobile shop 13 acquires the movement instruction from the server apparatus 10 until the time when the mobile shop 13 arrives at the collection point, and transmits the captured image to the server apparatus 10. The imager 53 repeats imaging and transmitting captured images in a predetermined cycle of, for example, ten seconds to twenty minutes.

When the mobile shop 13 arrives at the item collection point, by operating the exhibitor terminal apparatus 11, the exhibitor transmits the exhibited-item identification information acquired from the server apparatus 10 by the exhibitor terminal apparatus 11, and then the communication interface 50 of the mobile shop 13 acquires the exhibited-item identification information (step S614). Then, the mobile shop 13 transmits the exhibited-item identification information to the server apparatus 10, which then acquires the exhibited-item identification information (step S616). The exhibited-item identification information is transmitted from the exhibitor terminal apparatus 11 to the mobile shop 13, for example, by short-range wireless communication. Also, the exhibited-item identification information may be displayed on the exhibitor terminal apparatus 11 as an image code such as QR Code® (QR Code is a registered trademark in Japan, other countries, or both), for example, such that the mobile shop 13 will acquire the image code by reading the image code with a scanner provided on the input/output interface 55 of the mobile shop 13. Alternatively, an image code printed out from the exhibitor terminal apparatus 11 may be labelled on an item and then read by a scanner provided on the input/output interface 55 of the mobile shop 13. Because the mobile shop 13 acquires the exhibited-item identification information, confirmation that it is the exhibitor who has visited the mobile shop 13 can be obtained more reliably. Alternatively, the exhibited-item identification information may be transmitted from the exhibitor terminal apparatus 11 to the server apparatus 10 without involving the mobile shop 13. Then, the item is placed at any position among the item display positions by the exhibitor himself/herself or by an employee of the mobile shop 13. Then, the imager 53 images the item display position with the item displayed therein (step S618) and a captured image is transmitted to, and acquired by, the server apparatus 10 (step S620).

The server apparatus 10 detects an exhibited item based on temporal changes between the current captured image, from the mobile shop 13 at the time that the exhibited-item identification information is acquired, and previous captured images, and stores attributes and the like of the detected item in the memory 21 by associating the attributes and the like with the exhibited-item identification information and price information for the item, where the attributes and the like of the detected item include the shape of the item as well as the position of the item among the item display positions (step S622). Here, the server apparatus 10 may store the exhibited-item identification information to be transmitted to the exhibitor terminal apparatus 11 by the controller 22 in step S604 in the memory 21 and detect the exhibited item on condition that the exhibited-item identification information acquired from the exhibitor terminal apparatus 11 in step S614 matches the stored exhibited-item identification information. In this manner, confirmation that the item detected from captured images is the item corresponding to the exhibition request can be obtained more reliably. Furthermore, if the exhibited-item identification information acquired from the exhibitor terminal apparatus 11 does not match the stored exhibited-item identification information, the server apparatus 10 may alert the exhibitor by transmitting a warning to the exhibitor terminal apparatus 11. In this manner, it possible to avoid confusing the item to be exhibited.

Figure 7A:
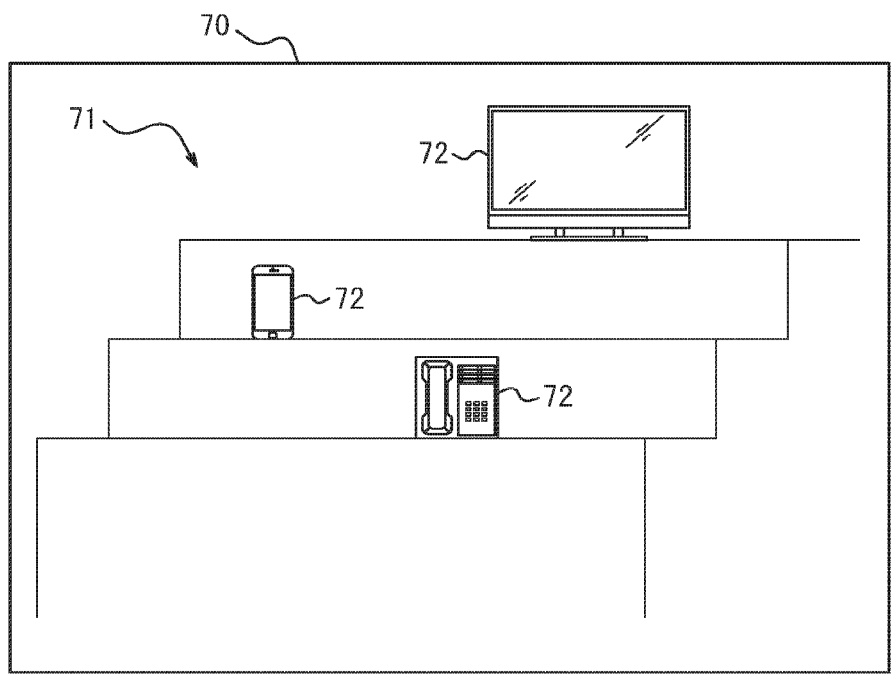
FIG. 7A illustrates an example of a temporal change in captured images.
Figure 7B:
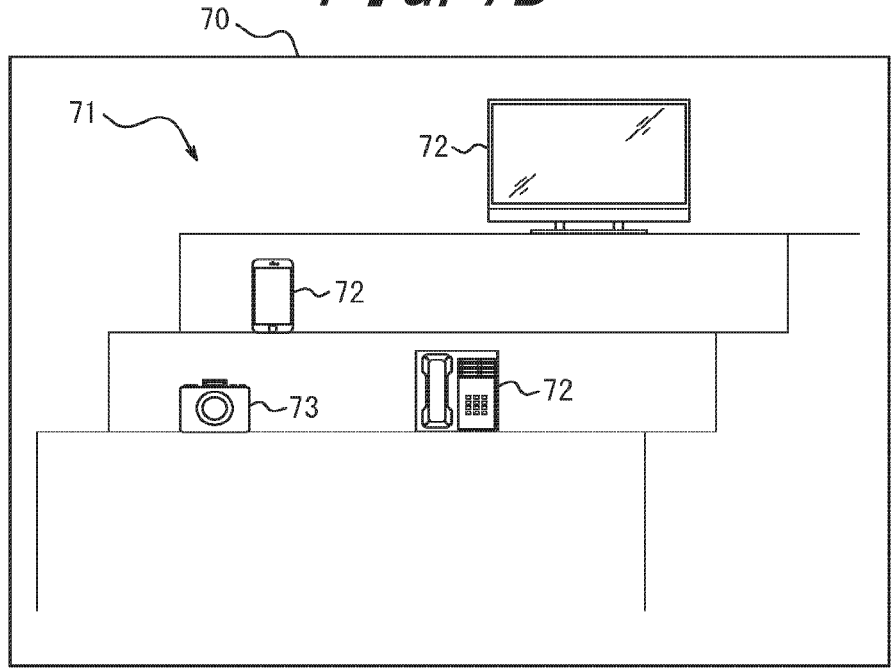
FIG. 7B illustrates an example of a temporal change in captured images.

Here, an example of a temporal change in captured images is illustrated in FIGS. 7A and 7B. As illustrated in FIG. 7A, before the exhibited-item identification information is acquired, a captured image 70 includes a display rack 71 serving as item display positions with items 72 already displayed. On the other hand, as illustrated in FIG. 7B, when the exhibited-item identification information is acquired, a captured image 70 shows a newly displayed item 73 in addition to the items 72 already displayed on the display rack 71. The server apparatus 10 detects the display rack 71 and the items 72 and 73 by using image processing such as edge detection and pattern recognition. Here, the captured image when the exhibited-item identification information is acquired is, for example, any of one or more captured images acquired within a predetermined period (ten seconds to twenty minutes) before and after the acquisition of the exhibited-item identification information. Thus, even if there is a time interval between the transmission of the exhibited-item identification information and item display or the transmission of the exhibited-item identification information and item display are reversed in order, the server apparatus 10 can acquire a captured image of the item display position after the item is newly added and displayed. Here, since the newly displayed item 73 is detected as a temporal change in the captured images 70, the server apparatus 10 stores the item 73 in the memory 21 by associating the item 73 with the exhibited-item identification information. Then, the server apparatus 10 uniquely manages the items displayed on the display rack 71 in captured images 70 by associating the displayed items with respective pieces of exhibited-item identification information. For example, information as to what exhibitor exhibited what item for what price and at what time is stored in the memory 21.

Information about any exhibited item as described above can be viewed by the purchaser at an EC site provided by the server apparatus 10. The purchaser views the EC site by operating the purchaser terminal apparatus 12, and performs the process of purchasing a desired item using the purchaser terminal apparatus 12.

Figure 8:
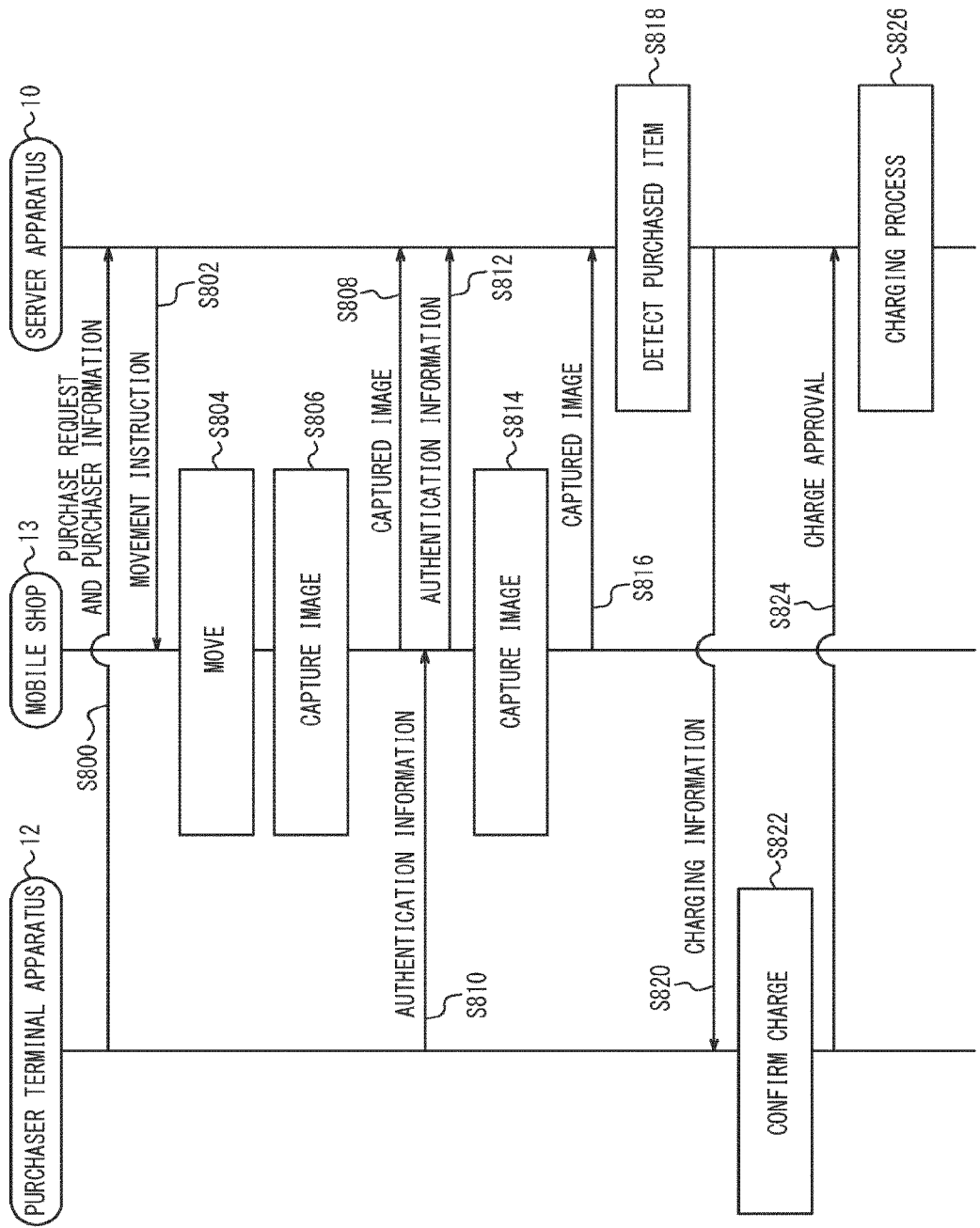
FIG. 8 is a sequence chart illustrating an exemplary operation of the information processing system when an item is purchased.

FIG. 8 is a sequence chart illustrating exemplary operations of the information processing system 1 when an item is purchased. The procedures of FIG. 8 are carried out when the purchaser purchases an item by operating the purchaser terminal apparatus 12. The steps in FIG. 8 also correspond to operations performed by the controllers of the respective apparatuses.

By being operated by the purchaser, the purchaser terminal apparatus 12 transmits a purchase request specifying an item as well as purchaser information to the server apparatus 10, and the server apparatus 10 acquires the purchase request and purchaser information (step S800). While selecting an item on the EC site, the purchaser enters the purchase request and purchaser information, for example, manually via a touchscreen. The server apparatus 10 identifies exhibited-item identification information corresponding to the selected item. The purchaser information includes identification information such as the name of the purchaser as well as position information about the position of a purchase point specified by the purchaser and financial account information for the purchaser. The purchaser information may be transmitted to the server apparatus 10 in advance by the purchaser in a one-time member registration process for the EC site on the server apparatus 10, and stored in the member information DB 23 of the server apparatus 10, or may be transmitted from the purchaser terminal apparatus 12 to the server apparatus 10 each time a purchase is made. The purchase point is any point specified by the purchaser as appropriate and may be, for example, the address or residence of the purchaser.

Next, the server apparatus 10 transmits an instruction to the mobile shop 13, instructing the mobile shop 13 to move to the purchase point, and the controller 56 of the mobile shop 13 acquires the movement instruction (step S802). Then, under the control of the controller 56, the mobile shop 13 moves to the purchase point (step S804).

In the mobile shop 13, the imager 53 images the item display position (step S806) and transmits a captured image to the server apparatus 10, which then acquires the captured image (step S808). The imager 53 images the item display position at least once from the time when the mobile shop 13 acquires the movement instruction from the server apparatus 10 until the time when the mobile shop 13 arrives at the purchase point, and transmits the captured image to the server apparatus 10. The imager 53 repeats imaging and transmitting of captured images in a predetermined cycle of, for example, ten seconds to twenty minutes.

When the mobile shop 13 arrives at the purchase point, the purchaser operates the purchaser terminal apparatus 12, causing the purchaser terminal apparatus 12 to transmit authentication information for the purchaser, and the communication interface 50 of the mobile shop 13 acquires the authentication information (step S810). Then, the mobile shop 13 transmits the authentication information to the server apparatus 10, which consequently acquires the authentication information (step S812). The authentication information is information that uniquely identifies the purchaser and corresponds to the purchaser information transmitted from the purchaser terminal apparatus 12 to the server apparatus 10 in step S800. For example, the purchaser information may be adopted as the authentication information. The authentication information is transmitted from the exhibitor terminal apparatus 11 to the mobile shop 13, for example, by short-range wireless communication. The authentication information also may be displayed on the purchaser terminal apparatus 12 as an image code such as QR Code® (QR Code is a registered trademark in Japan, other countries, or both) for example, such that the mobile shop 13 will acquire the image code by reading the image code with a scanner provided on the input/output interface 55 of the mobile shop 13. Because the mobile shop 13 acquires the authentication information for the purchaser, confirmation that it is the purchaser who has visited the mobile shop 13 can be obtained more reliably. Alternatively, the authentication information may be transmitted from the purchaser terminal apparatus 12 to the server apparatus 10 without involving the mobile shop 13. Then, the item is removed from the item display position by the purchaser himself/herself or by a crew member of the mobile shop 13. Then, the imager 53 images the item display position (step S814), and a captured image is transmitted to, and acquired by, the server apparatus 10 (step S816).

The server apparatus 10 detects the removed item as the purchased item based on a temporal change between the current captured image, from the mobile shop 13 at the time that the authentication information is acquired, and previous captured images (step S818).

Figure 9A:
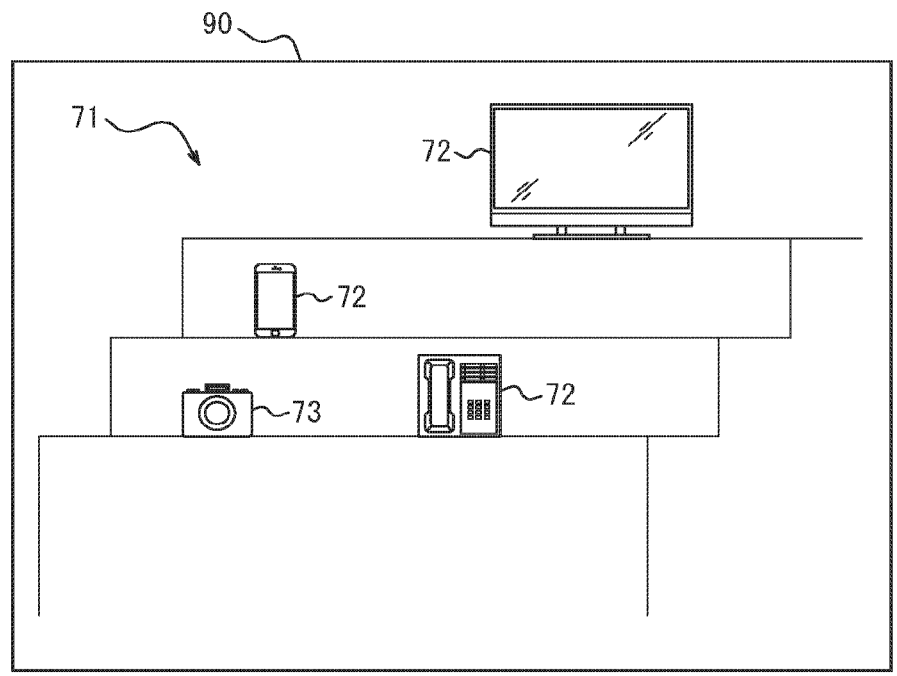
FIG. 9A illustrates an example of a temporal change in captured images.
Figure 9B:
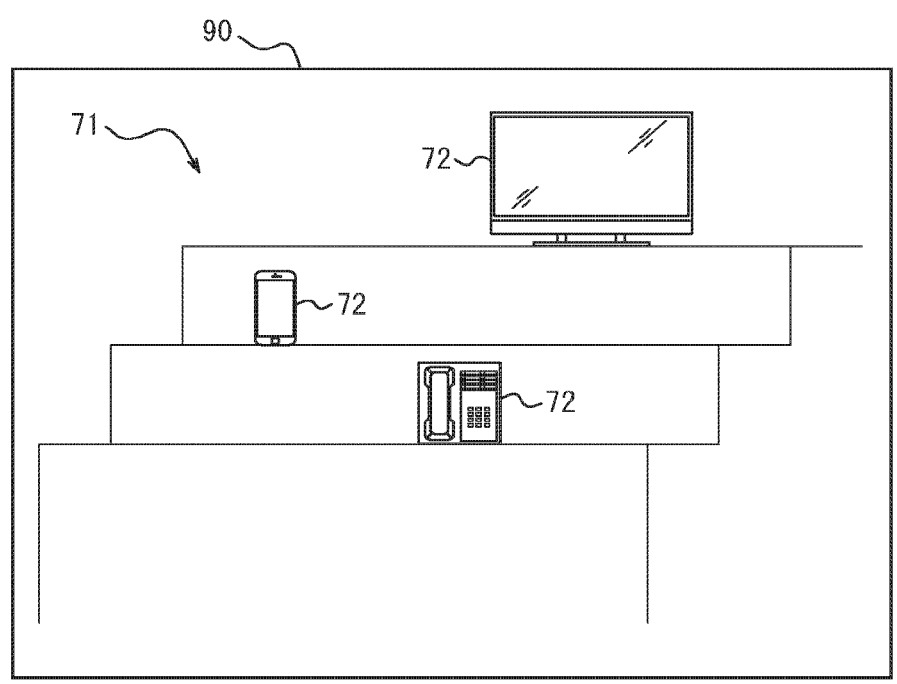
FIG. 9B illustrates an example of a temporal change in captured images.

Here, an example of a temporal change in captured images is illustrated in FIGS. 9A and 9B. As illustrated in FIG. 9A, before the authentication information is acquired, a captured image 90 includes a display rack 71 serving as item display positions and items 72 and 73 already displayed. On the other hand, as illustrated in FIG. 9B, when the authentication information is acquired, the captured image 90 contains only the items 72 left on the display rack 71 without containing the removed item 73. Here, the captured image when the authentication information is acquired is, for example, any of one or more captured images acquired within a predetermined period (ten seconds to twenty minutes) before and after the acquisition of the authentication information. Thus, even if there is a time interval between the transmission of the authentication information and item removal or the transmission of the authentication information and item removal are reversed in order, the server apparatus 10 can acquire a captured image of the item display position with the item 73 removed. Here, since the disappearance of the item 73 is detected as a temporal change in the captured images 90, the server apparatus 10 identifies exhibited-item identification information associated with the item 73.

In step S818 of FIG. 8, for example, if the exhibited-item identification information identified when the purchase request is acquired from the purchaser terminal apparatus 12 in step S800 matches the exhibited-item identification information of the removed item, the server apparatus 10 detects the purchased item. In addition to or instead of this, for example, when the purchaser information acquired from the purchaser terminal apparatus 12 in step S800 matches the authentication information acquired in step S812, the server apparatus 10 detects the purchased item. In this case, it can be determined that there is a high probability that the purchaser wishing to purchase the item has removed the desired item from the item display position.

When the purchased item is detected, based on price information associated with the exhibited-item identification information, the server apparatus 10 transmits charging information including the price of the purchased item to the purchaser terminal apparatus 12, which consequently acquires the charging information (step S820). Then, the purchaser terminal apparatus 12 outputs the charging information, asks the purchaser to confirm the charge and accepts a confirmation result entered by the purchaser (step S822). For example, by using display output or voice output, the purchaser terminal apparatus 12 notifies the purchaser that an item price will be charged, indicating the amount of the item price to the purchaser. After removing the desired item from the item display position, the purchaser checks the charging information for the price of the item and enters a charge approval, for example, via a touch panel. Then, the purchaser terminal apparatus 12 transmits the charge approval to the server apparatus 10, which consequently acquires the charge approval (step S824).

The server apparatus 10 performs a charging process in respect of the purchaser based on financial account information for the purchaser included in the purchaser information (step S826). For example, the server apparatus 10 transmits a request for a charging process to another server apparatus managing a financial account of the purchaser, and thereby charges the purchaser. The charging process includes any electronic payment means such as an inter-account money transfer, credit card payment, or virtual currency transfer. Also, the server apparatus 10 makes a remittance request to a server apparatus of a financial institution, requesting the server apparatus to transfer a sales price, with a predetermined handling charge deducted, to a financial account of the exhibitor. By obtaining a charged item as a precondition for the server apparatus 10 to perform a charging process, confirmation that the purchaser whose authentication information has been matched has actually purchased the item can be obtained more reliably.

The information processing system 1 that operates as described above can improve convenience by reducing workload and administrative load in trading of items between concerned parties. Also, since the mobile shop 13 collects items to be exhibited, the workload involved in the submission of items for exhibition by the exhibitor can be reduced. Also, since the mobile shop 13 carries the item to the purchase point, the purchaser is spared the trouble of moving to the point where a flea market is being held. Furthermore, since input and output of exhibited items are managed on the side of the server apparatus 10 using captured images of the item display position in the mobile shop 13, the staff of the mobile shop 13 can be reduced, and eventually the mobile shop 13 can be unmanned.

Figure 10:
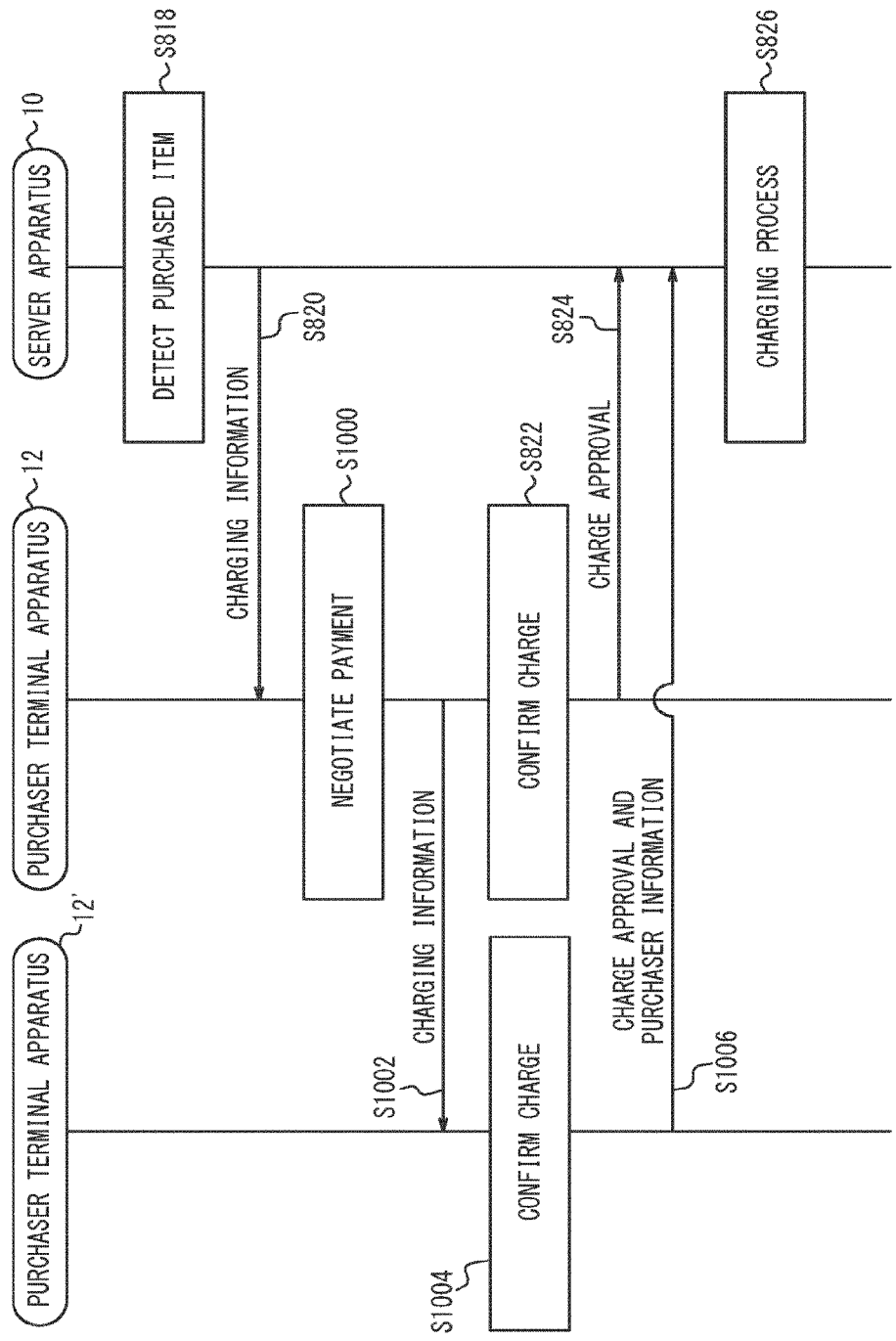
FIG. 10 is a sequence chart illustrating an exemplary operation of an information processing system according to a modified example.

FIG. 10 is a sequence chart illustrating operation procedures of an information processing system 1 according to a modified example of the present embodiment. FIG. 10 illustrates operation procedures for a charging process, in a case in which plural purchasers operate respective purchaser terminal apparatuses 12 and 12' (for convenience, it is assumed that the purchaser terminal apparatus 12 is operated by a purchaser A while the purchaser terminal apparatus 12' is operated by a purchaser A'). Steps that are modified examples of step S818 and subsequent steps in FIG. 8 and are similar to those in FIG. 8 are denoted by the same reference signs as the corresponding steps in FIG. 8.

In this modified example, the purchaser A makes a purchase request via the purchaser terminal apparatus 12 and the mobile shop 13 arrives at the purchase point specified by the purchaser A. Then, the purchaser A visits the mobile shop 13 either alone or together with the purchaser A'. When the purchaser A on the purchaser terminal apparatus 12 transmits the authentication information for the purchaser A via the purchaser terminal apparatus 12, the purchaser A or the purchaser A' removes the item from the item display position. Then, the server apparatus 10 detects the item purchased by the purchaser A (step S818), transmits charging information to the purchaser terminal apparatus 12, which consequently acquires the charging information (step S820).

Here, it is assumed that the purchaser A carries out item purchase operations, for example, on behalf of the purchaser A', who then actually pays the price. The purchaser terminal apparatus 12 initiates a payment negotiation menu, prompting the purchaser A to negotiate with another person regarding payment burden (step S1000). Then, by operating the purchaser terminal apparatus 12, the purchaser A transmits the charging information acquired from the server apparatus 10 by the purchaser terminal apparatus 12 to the purchaser terminal apparatus 12', which consequently acquires the charging information (step S1002). Here, the charging information is transferred from the purchaser terminal apparatus 12 to the purchaser terminal apparatus 12', for example, by short-range wireless, e-mail, or the like. The charging information transmitted from the purchaser terminal apparatus 12 to the purchaser terminal apparatus 12' may be a part of the item price or the whole of the item price. The purchaser terminal apparatus 12 provides an operation menu to the purchaser A, allowing the purchaser A to transmit the whole or the part of the item price to the purchaser terminal apparatus 12'.

Next, the purchaser terminal apparatus 12 outputs the charging information, asks the purchaser A to confirm the charge, and accepts a confirmation result entered by the purchaser A (step S822). Then, the purchaser terminal apparatus 12 transmits the charge approval to the server apparatus 10, which consequently acquires the charge approval (step S824). Here, if part of the item price is transmitted to the purchaser terminal apparatus 12' as charging information, the charge is confirmed and approved with respect to the remainder of the item price on the purchaser terminal apparatus 12. Alternatively, if all the item price is transmitted to the purchaser terminal apparatus 12' as charging information, steps S822 and S824 are omitted.

On the other hand, the purchaser terminal apparatus 12' outputs the charging information, asks the purchaser A' to confirm the charge, and accepts a confirmation result entered by the purchaser A' (step S1004). Then, the purchaser terminal apparatus 12' transmits purchaser information about the purchaser A' including charge approval and financial account information to the server apparatus 10, which consequently acquires the charge approval (step S1006).

Next, the server apparatus 10 performs a charging process in respect of the purchasers A and A' or the purchaser A', based on financial account information for the purchasers contained in the respective pieces of purchaser information (step S826). Note that if the charge approval is not acquired within a predetermined period (e.g., 10 minutes to several hours) from the purchaser terminal apparatus 12 or purchaser terminal apparatus 12', the server apparatus 10 may transmit a notice, urging the purchaser terminal apparatus 12 to approve the charge.

According to this modified example, when a purchaser is shopping, for example, with or for a friend and wants the friend to pay the whole or a part of the price, negotiations over the payment for the purchase can be simplified.

In the embodiment described above, a case in which the server apparatus 10 performs the entire process in which exhibition and removal of an item is detected based on temporal changes in captured images of an item display position in the mobile shop 13 is described as an example. However, all or part of the above process may be performed by the controller 56 of the mobile shop 13, with detection results being received by the server apparatus 10.

In the embodiment described above, the processing/control programs that define the operations of the controller 33 of the exhibitor terminal apparatus 11 and the controller 43 of the purchaser terminal apparatus 12 may be stored in a memory of the server apparatus 10 or another server apparatus and downloaded to each terminal apparatus via the network 15, or may be stored on a portable non-transitory recording/storage medium readable by each terminal apparatus and then read from the medium by each terminal apparatus. Also, the processing/control program that defines the operations of the controller 56 of the mobile shop 13 may be stored in a memory of the server apparatus 10 or another server apparatus and downloaded to the controller 56 of the mobile shop 13 via the network 15, or may be stored on a portable non-transitory recording/storage medium readable by the controller 56 and then read from the medium by the controller 56.

While an embodiment has been described above based on the drawings and examples, it should be noted that various modifications and revisions can be easily made by those skilled in the art based on the present disclosure. Therefore, it should be noted that such modifications and revisions are encompassed by the scope of the present disclosure. For example, the functions and the like included in each means, step, or the like can be rearranged without any logical contradiction, and a plurality of means, steps, or the like can be combined into one or each means, step, or the like can be divided.

The invention claimed is:

1. A server apparatus, comprising:
a controller configured to:
detect an item to be purchased, based on a temporal change in captured images of an item display position in a mobile shop,
upon acquiring authentication information for a purchaser from a first terminal apparatus, perform a charging process in respect of the purchaser for a price of the item,
when a position of a purchase point specified by a purchaser is acquired from the first terminal apparatus, transmit a movement instruction to the mobile shop, instructing the mobile shop to move to the purchase point, and
perform the charging process conditional on the authentication information acquired from the first terminal apparatus before transmitting, to the mobile shop, the movement instruction instructing the mobile shop to move to the purchase point, matching the authentication information acquired from the first terminal apparatus after the mobile shop moves to the purchase point.

2. The server apparatus according to claim 1, wherein when the item is to be exhibited, upon acquiring a position of a collection point for the item from a second terminal apparatus, the controller transmits an instruction to the mobile shop, instructing the mobile shop to move to the collection point and collect the item.

3. The server apparatus according to claim 2, further comprising a memory configured to store identification information for an item to be exhibited, wherein
the controller transmits the identification information to the second terminal apparatus, and detects the item added to the display position as the item to be exhibited in a case in which the identification information acquired from the second terminal apparatus matches the identification information stored in the memory when the item is displayed in the item display position.

4. The server apparatus according to claim 3, wherein the controller acquires the identification information from the second terminal apparatus via the mobile shop.

5. The server apparatus according to claim 3, wherein if the captured image acquired when the identification information is acquired from the second terminal apparatus contains an item not contained in past captured images the controller detects the item to be exhibited.

6. The server apparatus according to claim 5, wherein the controller transmits a warning to the second terminal apparatus if the identification information acquired from the second terminal apparatus does not match the identification information stored in the memory when the item is displayed in the item display position.

7. The server apparatus according to claim 1, wherein the controller performs the charging process if the item contained in the image captured before acquisition of the authentication information is not contained in the image captured when the authentication information is acquired.

8. The server apparatus according to claim 1, wherein the controller acquires the authentication information from the first terminal apparatus via the mobile shop.

9. The server apparatus according to claim 1, wherein the controller transmits charging information including the price to the first terminal apparatus and performs the charging process conditional on approval being acquired from the first terminal apparatus.

10. The server apparatus according to claim 9, wherein when approval is acquired from a third terminal apparatus acquiring the charging information from the first terminal apparatus, the controller performs the charging process on another purchaser based on authentication information acquired from the third terminal apparatus.

* * * * *